3,506,630
ETHYLENE-VINYL ACETATE COPOLYMER PREPARED IN THE PRESENCE OF MINOR AMOUNTS OF BUTYRALDEHYDE
Gerhard Beier, Eduard Bergmeister, and Hubert Wiest, Burghausen, Upper Bavaria, Germany, assignors to Wacker-Chemie G.m.b.H., Munich, Germany, a corporation of Germany
No Drawing. Filed Dec. 30, 1968, Ser. No. 788,049
Claims priority, application Germany, Feb. 20, 1968, 1,745,570
Int. Cl. C08f 1/80, 15/16
U.S. Cl. 260—80.81                              2 Claims

ABSTRACT OF THE DISCLOSURE

In copolymerizing ethylene and vinyl acetate, optionally with a third aldehyde monomer, using a redox catalyst consisting of (1) a per-compound, (2) hydrogen, and (3) a colloidally dispersed noble metal, the incorporation of minor amount of a C-4 to C-8 aldehyde into the polymerization recipe gives polymers which form clear, blob-free solutions in organic solvents.

THE PRIOR ART

The preparation of copolymers of ethylene and vinyl acetate has been known for a long time. Due to their excellent stability toward light and aging and their mechanical properties which may be varied by means of variation of the ethylene content and the molecular weight, such copolymerizates are used with increasing frequency in the industrial field. If the ethylene content is between 20 to 80 mol percent of ethylene, then plastic adhesive to rubber-like polymerizates are obtained which are suitable as adhesive substances, coating and rubberlike articles and which are stable to light and aging, ozone resistant as well as possessing good oil resistance.

It is a prerequisite, however, if these copolymerizates are used for coatings and bonding compounds that the copolymerizates be soluble in organic solvents, in order that they can be used in dissolved form.

Such soluble copolymers of ethylene with an ethylene content of 20 to 80 mol percent can be prepared in tert.-butanol as a polymerization solvent and under high pressure, e.g., according to German Auslegeschrift 1,181,420. In most cases tert.-butanol is unsuited as a solvent for further industrial preparations so that the polymer has to be isolated from this solution and has then to be dissolved again in customary solvent media. On the other hand, solvents suitable for further preparation of industrial solutions such as esters, ketones, hydrocarbons and chlorinated hydrocarbons cannot be employed as a polymerization medium since they prevent the polymerization or give only extremely low molecular weight copolymers with inferior mechanical properties.

By a particularly economic way according to a known process (German Auslegeschrift 1,133,130) ethylene can be polymerized with vinyl acetate in good yields in an aqueous dispersion at low temperatures and pressures. By this process, one works with a redox catalyst system of inorganic or organic per-compounds, hydrogen and colloidally dispersed noble metals. However, the thus prepared ethylene-vinyl acetate copolymers are soluble in organic solvents only partially and in a highly blobby form. For any application in dissolved form, these copolymers are unsuitable.

It is also known that aldehydes can be used as polymerization regulators, that is, for the lowering of the degree of polymerization (for example, in the polymerization of vinyl acetate). The K-value according to Fikentscher is a common measurement of the degree of polymerization.

Aliphatic aldehydes also have this K-value decreasing property when utilized in the preparation of copolymerizates of ethylene and vinyl acetate in aqueous dispersion. However, ethylene-vinyl acetate copolymerizates are obtained with the employment of aldehydes with up to 3 carbon atoms, which dissolve in common organic solvents only partially and give solutions containing blobs of undissolved and partially solvated polymer.

OBJECTS OF THE INVENTION

An object of the present invention is the obtention of copolymerizates of ethylene and vinyl acetate which form clear, blob-free solutions in organic solvents.

Another object of the invention is the obtention of copolymerizates of ethylene and vinyl acetate forming clear, blob-free solutions in organic solvents, containing from 30 mol percent to 80 mol percent of ethylene, from 70 mol percent to 20 mol percent of vinyl acetate, with the proviso that up to 10 mol percent of said vinyl acetate can be replaced by another free-radical-polymerizable monomer, and from 0.2% to 3% by weight, based on the weight of said vinyl acetate, of an alkanal having from 4 to 8 carbon atoms.

A further object of the invention is the development in the process of preparing mixed polymerizates from ethylene, vinyl acetate and possibly free-radical-polymerizable monomers which comprises the step of polymerizing ethylene, vinyl acetate and possibly other free-radical-polymerizable monomers in such a ratio as to obtain a copolymerizate containing from 30 mol percent to 80 mol percent of ethylene, from 70 mol percent to 20 mol percent of vinyl acetate, with the proviso that up to 10 mol percent of said vinyl acetate can be replaced by said other free-radical-polymerizable monomer, in an aqueous dispersion in the presence of free radical producing compounds and protective colloids, emulsifiers and combinations thereof, the improvement which comprises conducting said polymerization in the presence of a polymerization regulating amount of an alkanal having from 4 to 8 carbon atoms, whereby said mixed polymerizate form clear, blob-free solutions in organic solvents.

These and other objects of the invention will become more apparent as the description thereof proceeds.

DESCRIPTION OF THE INVENTION

According to the invention, it was found that upon the employment of straight and/or branched chained aliphatic aldehydes with a chain-length of from 4 to 8 carbon atoms in the preparation of copolymerizates of ethylene and vinyl acetate having an ethylene content of from 30 to 80 mol percent, possibly with the addition of other free-radical-polymerizable monomers in amounts up to 10 mol percent of the vinyl acetate portion of the copolymer, in aqueous dispersion in the presence of free-radical producing compounds as well as protective colloids and/or emulsifiers, products occur which are soluble in organic solvents to give clear, blob-free solutions.

The ability of the copolymerizates according to the invention to form clear, blob-free solutions is completely unexpected since the thus-prepared copolymerizates exhibit a K-value which lies in the same range as do the K-values of copolymerizates of ethylene and vinyl acetate which had been prepared while employing aldehydes having less than 4 carbon atoms, which copolymerizates do not form clear, blob-free solutions.

As aldehydes for the preparation of the copolymerizates according to the present invention, the following alkanals having from 4 to 8 carbon atoms can be utilized: butyraldehyde, pentanal, hexanal, isobutyraldehyde, 2- ethylhexanal, diethylacetaldehyde, etc. Already, with butyraldehyde, a complete dissolution of the copolymerizates in organic solvents can be obtained. It is useful to employ the alkanals in amounts between 0.2% to 3% by weight of aldehyde, based on the amount of vinyl acetate monomers. The addition may be carried out either by adding the total amount at the beginning of the polymerization or by gradually adding the aldehyde in the course of polymerization.

The copolymerization of ethylene with vinyl acetate is carried out according to known methods (German Auslegeschrift 1,133,130) while using free-radical producers, protective colloidals and emulsifiers, in an aqueous dispersion. A redox polymerization catalyst system is preferred utilizing (1) inorganic per-compounds, organic peroxides or organic hydroperoxides, (2) hydrogen and (3) colloidally dispersed noble metals of the VIII subgroup of the periodic table. This catalyst system may also include ions of the metals, iron, copper, nickel, cobalt, chromium, molybdenum, vanadium, and cerium in addition, either individually or in combination. The polymerization can be carried out at temperatures between −50° C. up to +110° C. and at pressures of 10 to 300 atmospheres. The weight ratio of water to the monomers amounts to 1:2 to 10:1, preferably 2:3 to 4:1, as is common for the polymerization of unsaturated organic compounds in aqueous dispersions.

As other free-radical-polymerizable monomers which may be added to replace up to 10 mol percent of the vinyl acetate with good success are, in particular, vinyl esters of straight and branched carboxylic acids, particularly vinyl alkanoates having from 5 to 24 carbon atoms, such as vinyl propionate, vinyl butyrate, vinyl laurate as well as the vinyl esters of isononanoic acid, of isotridecanoic acid, and of the Versatic acids ("Versatic" is a registered trademark for branched chain alkanoic acids having 9 to 22 carbon atoms); as well as unsaturated mono- and dicarboxylic acids, for example, alkenoic acids having 3 to 8 carbon atoms such as acrylic acid, methacrylic acid; alkenedioic acids having 4 to 8 carbon atoms such as maleic acid, fumaric acid; and the esters of the named acids wtih mono- and poly-hydric alcohols, for example, alkanols, alkenols, alkanediols, alkanetriols, etc., having from 1 to 22 carbon atoms. Here fumaric acid is particularly suitable.

The copolymers of ethylene and vinyl acetate can be isolated from the aqueous dispersion, by means of filtration, precipitation, coagulation, spray drying or drying on heated rollers. Thus, the difficulties are circumvented which occur upon the drying of polymers prepared in solvent systems, such as in the case of copolymers which are prepared in a tert.-butanol solvent system.

The copolymerizates of ethylene and vinyl acetate of the invention are soluble in esters, aromatic solvents, ketones and chlorinated hydrocarbons to give clear, blob-free solutions and are consequently suitable for many purposes. Thus copolymers with 50 to 80 mol percent of ethylene and with a K-value of 40 to 70 produce excellent coatings. The copolymer solutions, possibly mixed with fillers, can be applied as coatings and, subsequently, after evaporation of the solvent, can be cross-linked, for example, by means of addtion of a peroxide. Thereupon an excellently adhesive coating of high mechanical stability and of a rubberlike nature is obtained which is characterized in particular by an excellent stability against the action of light, ozone and aging. In this way, weather-resistant awnings and tent fabrics can be prepared with either transparent or opaque coatings.

The soluble, rubberlike copolymerizates of ethylene and vinyl acetate of the invention are excellently suited as adhesive substances as well. Their compatibility with resins such as alkyl phenolic resins, terpenephenol resins, cumarone-indene resins, aldehyde-ketone resins, colophonium and pentaerythrite esters of abietic acids is very favorable. Combinations of such resins with the soluble ethylene-vinyl acetate copolymers produce, depending on the type of the added resin, contact or permanent adhesives which are stabile against oxidation and aging. In contrast, the known adhesive substances which are prepared from natural or synthetic rubbers do not have any such favorable properties due to the presence of double bonds in the elastomer.

The following examples are illustrative of the practice of the invention. They are not, however, to be deemed limitative of the invention in any respect.

The parts indicated in the examples are always by weight.

Example 1

In a stirrer autoclave, 100 parts of water, 20 parts of methanol, 1.0 part of methyl cellulose, 0.8 part of alkylbenzene sulfonate, 0.00015 part of palladium in a colloidal, aqueous solution and 0.3 part of ammonium persulfate were admixed. The pH value was adjusted to approximately 3 by means of hydrochloric acid and the autoclave was evacuated in order to remove atmospheric oxygen. Subsequently, 60 parts of vinyl acetate and 1% by weight, based on the amount of vinyl acetate, of butyraldehyde were pumped into the autoclave. The contents of the autoclave were cooled to +10° C. and 60 parts of ethylene were impressed therein. A pressure of approximately 50 atmospheres resulted. After pumping in approximately 1 atmosphere excess pressure of hydrogen, the polymerization recipe was polymerized for 15 hours at 10° C. while being stirred. A copolymer with an ethylene content of 36% by weight and a K-value of 59 was obtained. A 25% solution of the precipitated and dried copolymerizate in toluene was clear and completely blob-free.

Example 2

A polymerization recipe according to Example 1, however with 1% by weight of propionaldehyde, based on the weight of vinyl acetate, instead of butyraldehyde, was polymerized. A copolymer with an ethylene content of 35% by weight and a K-value of 58 was produced. The precipitated and dried product gave only a turbid and highly blobby solution in toluene or in other solvents such as trichloroethylene or butanone.

Example 3

A polymerization recipe according to Example 1, however with 1% by weight of acetaldehyde based on the weight of vinyl acetate, instead of butyraldehyde, was polymerized. A copolymer with an ethylene content of 36% by weight and a K-value of 55 was produced. No clear, blob-free solutions could be prepared from the product.

Example 4

A polymerization recipe according to Example 1, however with 0.8% by weight of butyraldehyde, based on the amount of vinyl acetate, and 70 parts of ethylene, was polymerized. A copolymer with a K-value of 65, and an ethylene content of 41% by weight was produced. From this product clear and completely blob-free solutions could be prepared in normal organic solvents.

Example 5

A polymerization recipe according to Example 1, however with 1.2% by weight of butyraldehyde, based on the amount of vinyl acetate, was polymerized. A copolymer with a K-value of 58 was produced. With this product, blob-free, clear solutions could be prepared in normal organic solvents.

Example 6

A polymerization recipe according to Example 1, however with no aldehyde addition was polymerized. A polymerizate that was practically insoluble in common solvents and had a K-value of above 80 was produced.

COMPARATIVE TABLE

| Polymerization recipe according to example | Percent aldehyde based on vinyl acetate | Copolymerizate | | Appearance of a 20% solution in toluene |
|---|---|---|---|---|
| | | Percent ethylene by weight | K-value | |
| 1 (invention) | 1% butyraldehyde | 36 | 59 | Clear, blob-free. |
| 2 | 1% propionaldehyde | 35 | 58 | Turbid, highly blobby. |
| 3 | 1% acetaldehyde | 36 | 55 | Do. |
| 6 | | 37 | >80 | Practically insoluble. |
| 4 (invention) | 0.8% butyraldehyde | 41 | 64 | Clear, blob-free. |
| 5 (invention) | 1.2% butyraldehyde | 36 | 58 | Do. |

Example 7

A polymerization recipe as in Example 1, which contained an additional 1.5 parts of fumaric acid, was polymerized. After precipitation and drying, a copolymerizate was obtained which dissolved in ethyl acetate, toluene or trichloroethylene to give clear blob-free solutions. Through addition of polyhydric alcohols, epoxides or isocyanates, the copolymerizate could be cross-linked.

Example 8

A contact adhesive was prepared from 22 parts of the ethylene-vinyl acetate copolymerizate according to Example 5, 13 parts of a modified phenolic resin with acid number of 100 and a melting range of 140° to 160° C., as well as of a solvent mixture of 40 parts of ethyl acetate, 16 parts of toluene and 10 parts of benzene with a boiling range of 80° to 110° C. The following values in comparison with an analogous adhesive substance which, instead of the ethylene-vinyl acetate copolymer contained polychloroprene were obtained.

SOLIDITY FOR RUBBER-RUBBER BONDINGS

| Adhesive with— | Stability toward peeling, kg./3 cm. | | Shear strength, kg./cm.² | |
|---|---|---|---|---|
| | Immediately | After 10 Days | After 3 Days | After 30 Days |
| Ethylene-vinyl acetate copolymer according to Example 5 | 5 | 28 | 10 | 15 |
| Polychloroprene | 5 | 16 | 9 | 9 |

In this test, the rubber was coated on both sides with the adhesive solution and after 20 minutes of air drying, it was compressed for 30 seconds under a pressure 5 kg./cm.². Even after long storage periods, the bond with the ethylene-vinyl acetate copolymerizate of the invention did not show any signs of decreasing bond strength.

The preceding specific embodiments are illustrative of the practice of the invention. It is to be understood, however, that other expedients known to those skilled in the art may be employed without departing from the spirit of the invention.

We claim:
1. In the process of preparing mixed polymerizates from ethylene and vinyl acetate, with or without additional free-radical-polymerizable monomers selected from the group consisting of vinyl alkanoates having from 5 to 24 carbon atoms, alkenoic acids having 3 to 8 carbon atoms, alkenedioic acids having 4 to 8 carbon atoms and esters of said alkenedioic acids with alcohols having 1 to 24 carbon atoms selected from the group consisting of alkanols, alkenols, alkanediols and alkanetriols, which comprises the step of polymerizing ethylene and vinyl acetate, with or without additional other free-radical-polymerizable monomers in such a ratio as to obtain a copolymerizate containing from 30 mol percent to 80 mol percent of ethylene, from 70 mol percent to 20 mol percent of vinyl acetate, with the proviso that up to 10 mol percent of said vinyl acetate can be replaced by said other free-radical-polymerizable monomer, in an aqueous dispersion in the presence of a redox polymerization catalyst system consisting of (1) inorganic per-compounds, organic peroxides or organic hydroperoxides (2) hydrogen and (3) colloidally dispersed noble metals and protective colloids, emulsifiers and combinations thereof, the improvement which comprises conducting said polymerization in the presence of from 0.2% to 3% by weight, based on the weight of said vinyl acetate, of butyraldehyde, whereby said mixed polymerizates form clear, blob-free solutions in organic solvents.

2. The process as defined in claim 1, wherein up to 10 mol percent of said vinyl acetate is replaced by fumaric acid.

References Cited

UNITED STATES PATENTS

| 2,396,209 | 3/1946 | Sharkey | 260—73 |
| 2,417,404 | 3/1947 | Minsk et al. | 260—84 |
| 2,485,239 | 10/1949 | Izard | 260—67 |
| 3,145,194 | 8/1964 | Heckmaier et al. | 260—79.3 |

JOSEPH L. SCHOFER, Primary Examiner

J. C. HAIGHT, Assistant Examiner

U.S. Cl. X.R.

260—87.3